Nov. 3, 1964  W. DUBBELD  3,154,853
CHEESE MOLD
Filed Oct. 7, 1963
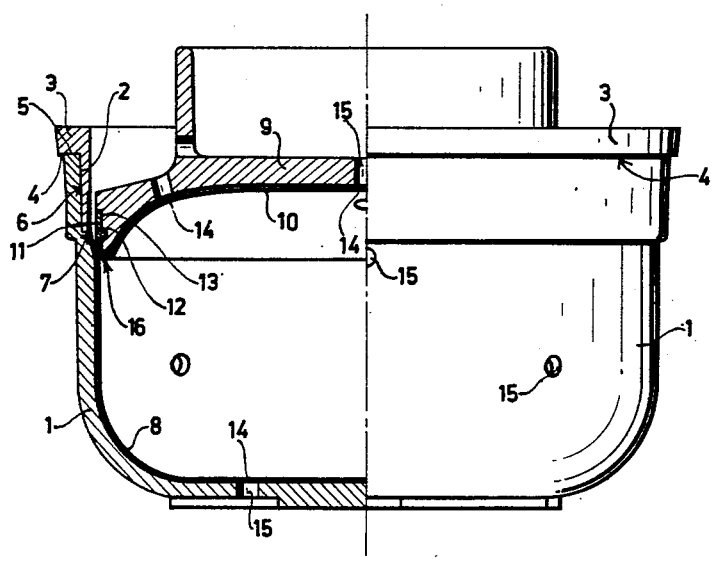

United States Patent Office 3,154,853
Patented Nov. 3, 1964

3,154,853
CHEESE MOLD
Willem Dubbeld, Karel Doormanstraat 228,
Rotterdam, Netherlands
Filed Oct. 7, 1963, Ser. No. 314,121
1 Claim. (Cl. 31—44)

At present the most common way of cheese making consists in applying the still original method in which there is used a cheese mold, a piece of cotton fabric and a follower or upper mold part. The application of this piece of fabric has various disadvantages which among other things are experienced in that:

(a) Much manual labour has to be done for wrapping and unwrapping the cheese;
(b) There is a formation of overflow of cheese which must be cut away (waste of cheese), whereby a wound appears on the cheese;
(c) Wrinkling of the fabric leaves impressions (in which as a rule fungoid growth develops), which are straightened out by pressing once more the cheese which prior thereto has been turned upside down in the mold, a rind formation being simultaneously produced on the cheese wound;
(d) The cotton cheese fabric is liable to rotting and consequently has a short life time;

the whole process being time consuming and requires much manual labour.

The invention starts from the process in which a cheese mold is used for making cheese, the said mold consisting of a lower cup in which some holes are provided, and of an upper cup or follower, each cup being provided with a piece of fabric, which is preformed and adapted to the shape of the inner side of the mold and follower, respectively. In a known embodiment of such a cheese mold both cups consist of rubber or the like elastic material with on the inner surface thereof a fixed lining of one or more layers of canvas or metal gauze or other reinforcing material. This fixed lining replaces the conventionally applied piece of fabric, which imparts the non-smooth appearance to the cheese.

A fixed lining is advantageous in that there are no wrinkles therein which otherwise would leave impressions on the surface of the cheese in which later as a rule fungoid growth develops and clefts appear.

A disadvantage of the fixed lining however is among other things experienced in that the material thereof is of canvas, consequently cotton, which owing to its permanent moist condition deteriorates rather rapidly, which results in that the whole cheese mold and follower must be written off.

Another disadvantage is experienced in that after the shaping of the curd the cheese mold and the follower with fixed lining must both simultaneously remain inactive for a definite time, viz. during the time they are cleaned, that is to say after each molding of a cheese the mold and the follower will during a certain lapse of time not be available for the molding process proper or the shaping of the curd into the desired type of cheese.

It is an object of the invention to eliminate the disadvantages mentioned hereinbefore, whereby the production rate of each cheese mold is speeded up and the products become cheaper. According to the invention both pieces of fabric in the mold cups consist of synthetic resin and are each connected to a ring capable of clampingly bearing on the edge of the lower cup and of the follower, respectively.

Due to these features both cups of the cheese mold can after a simple cleansing be immediately used again with a new piece of fabric. The just mold block of cheese will be protected in its piece of fabric with its ring, so that the cheese will keep its definite shape and can now be conveyed to the store. The piece of fabric can after loosening the cheese be carefully cleaned. Under these conditions the mold parts are at once again available for the next molding operation and need not remain inactive for a lapse of time.

The expulsion of the cheese in its desired shape from the piece of fabric becomes very simple and easy; by applying some axial pressure at the bottom of the preformed piece of fabric in the direction of the ring thereof, the side wall of the fabric will radially bulge outwardly, whereas the bottom itself bulges inwardly so that due to the axial pressure mentioned the cheese is automatically loosened from the fabric, which process can be easily mechanized.

Each piece of fabric is on its edge provided with a ring so as to keep same in good shape. The ring can further serve as a temporary fastening element of the piece of fabric in its concerning mold part. The ring for the piece of fabric may have a centering function upon the edge of the mold cup.

The cheese mold according to the invention allows for the mechanization of the process, since practically no skill is required for this work.

It should be noted that it is known in the art to use two pieces of ordinary cotton fabric instead of one. One piece of fabric is here laid over an empty lower cup and pressed together with a quantity of curd thereinto. The upper side of the curd is covered with a second piece of fabric. Since these pieces of cotton fabric have no predetermined shape the wrapping is done by hand which consumes much time.

From the U.S. Patent specification 2,266,336 there is known a cheese mold which is handled by means of two manually placed pieces of cotton fabric, which, however, are not secured to a ring. There is a ring which however guides the protruding edges of the fabric and serves further for guiding the downwardly directed movement of the upper mold cup toward the lower cup. The unit must be dismounted and consequently removed from the press and opened for straightening out the wrinkles or eliminating the folds from the pieces of fabric, and is thereupon assembled again for the final pressing operation. This way of cheese making consumes much time and requires much manual labor, which results in that the product might become expensive.

An embodiment of the cheese mold according to the invention will hereinafter be described with reference to the accompanying drawing which shows a two piece mold with parts in section.

The cheese mold consists of a lower cup 1, which has a slightly bevelled part 2 along its entire upper edge, a flat ring 3 being capable to be placed in this part. The ring 3 with its lower side 4 rests upon the upper edge 5 of the lower cup 1. The ring 3 has a depending skirt 6 which is bevelled corresponding to the side 2. By means of this skirt 6 the ring 3 is clamp upon the lower cup 1. Suspended from the lower edge 7 of the skirt 6 of the ring 3 so as to fit in the lower cup 1 is a preformed piece of fabric 8 which is casted to the ring 3.

The cheese mold further comprises a follower 9 provided with a loose piece of fabric 10. Casted to the edge 16 of a piece of fabric 10 is a ring 12, which cooperates by means of its inner wall 11 with the outer side 13 of the follower 9, so as to clampingly fit same.

Since the follower 9 with its ring 12 fits in the lower cup 1 the overflow of curd is prevented during the pressing down of the follower on a predetermined quantity of curd. Only the moisture (whey) is pressed away through the meshes 14 of the fabric 8 and 10 covering draining holes 15 in the bottom and wall of the lower cup 1 as well as in the follower 9. After this pressing operation the follower 9 is removed and the lump of curd is in its desired shape so that it may be lifted from the cup 1 together with the fabric 8 and the ring 3.

If the fabric 8 or 10 is damaged which only very seldom happens either the ring 3 or the ring 12 together with the piece of fabric is renewed. The mold parts 1 and 9 are always instantly available for use after a quick rinsing. The parts 3, 8 and 10, 12 need a more time consuming cleaning.

All parts of the cheese mold according to the invention are made of synthetic resin, especially low pressure polyethylene or polypropylene.

The whole process of the shaping of a predetermined quantity of curd by means of the cheese mold according to the invention described hereinbefore can be carried out mechanically.

On using the cheese mold according to the invention the advantages in respect of the still practised original process of shaping curd can be summarized as follows:

(1) Wrapping the curd by hand is avoided;
(2) Shelling the cheese from the fabric is not required;
(3) The overflow of curd is prevented so that there is no waste of cheese;
(4) It is no longer necessary to cut off the otherwise produced overflow;
(5) In view of item 4 there is no cheese wound;
(6) It is no longer necessary to turn the cheese upside down and to press some again for the required formation of a rind on the otherwise produced cheese wound;
(7) There is no rotting of the pieces of fabric;
(8) Impressions in the rind do no longer occur;
(9) Cleaning and washing of the parts of the cheese mold can be effected by separate treatments, the lower cup and the follower being capable to be immediately used again with a new piece of fabric, while the used piece of fabric, if need be, can be more carefully cleaned. In practice more fabric elements 3, 8 and 10, 12 than cheese mold elements 1 and 9 will be in stock.

What I claim is:

A cheese mold for making cheese comprising a lower cup element, a follower element slidably received therein, both elements having openings therethrough, pre-shaped inner linings of fabric made of synthetic resin, the shape of the linings corresponding respectively to the inner shape of each mold element, and a ring being connected to an edge of each of the said inner linings, said rings being capable of clampingly bearing upon an edge of the lower cup element and of the follower element respectively.

References Cited by the Examiner

UNITED STATES PATENTS

| | | | |
|---|---|---|---|
| 2,619,029 | 11/52 | Gherbaz | 31—42 |
| 3,008,235 | 11/61 | Royer et al. | 31—44 |

SAMUEL KOREN, *Primary Examiner.*

HUGH R. CHAMBLEE, *Examiner.*